(12) United States Patent
Steele

(10) Patent No.: US 7,410,125 B2
(45) Date of Patent: Aug. 12, 2008

(54) ROBOTICALLY ASSISTED LAUNCH/CAPTURE PLATFORM FOR AN UNMANNED AIR VEHICLE

(75) Inventor: Daniel W. Steele, Clay, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 495 days.

(21) Appl. No.: 10/908,278

(22) Filed: May 5, 2005

(65) Prior Publication Data

US 2006/0249623 A1 Nov. 9, 2006

(51) Int. Cl.
*B64C 25/68* (2006.01)

(52) U.S. Cl. .............................. 244/110 E; 244/110 C; 244/63

(58) Field of Classification Search .................... 244/63, 244/110 R, 110 E, 110 C
See application file for complete search history.

(56) References Cited

U.S. PATENT DOCUMENTS

| | | | |
|---|---|---|---|
| 3,968,947 A | | 7/1976 | Schlegel |
| 4,079,901 A | | 3/1978 | Mayhew et al. |
| 4,103,849 A | | 8/1978 | Holt et al. |
| 4,238,093 A | | 12/1980 | Siegel et al. |
| 4,240,599 A | | 12/1980 | Hammond |
| 4,523,729 A | * | 6/1985 | Frick ........................... 244/115 |
| 4,678,143 A | | 7/1987 | Griffin |
| 4,909,458 A | | 3/1990 | Martin |
| 5,054,717 A | * | 10/1991 | Taylor ..................... 244/110 F |
| 5,092,540 A | | 3/1992 | Burgess et al. |
| 6,305,642 B1 | | 10/2001 | Johnson |
| 6,457,673 B1 | | 10/2002 | Miller |
| 6,626,399 B2 | | 9/2003 | Young et al. |
| 6,729,578 B2 | | 5/2004 | Wood et al. |
| 7,114,680 B2 | * | 10/2006 | Dennis ......................... 244/63 |
| 2006/0186266 A1 | * | 8/2006 | Kennedy ...................... 244/63 |
| 2007/0108345 A1 | * | 5/2007 | McDonnell ............. 244/110 C |

* cited by examiner

*Primary Examiner*—John W Eldred
(74) *Attorney, Agent, or Firm*—George R. McGuire; Bond Schoeneck & King, PLLC

(57) ABSTRACT

An embodiment of the invention is directed to a platform for launching and/or capturing an unmanned air vehicle (UAV), particularly a small UAV. The launch/capture platform includes a frame, a floor attached to the frame that is capable of supporting the UAV, means for acquiring and tracking the UAV in flight, a connector and a connector controller, connecting the platform to an external support structure, providing a controllable, adaptive motion of the platform in response to approaching UAV position and attitude, means for launching the UAV from the platform and for capturing an in-flight UAV to the platform, and means for locking down the UAV between the capture and launch of the UAV. Another embodiment of the invention directed to a method for capturing a small, in-flight UAV involves providing a UAV capture platform, providing a UAV capturing means as an integrated component of the platform, providing means for determining in real-time the relative location of an engaging portion of the capturing means with respect to an approaching in-flight UAV, providing means for automatically maneuvering the engaging portion of the capturing means with respect to at least one of a position and an attitude of the approaching in-flight UAV, capturing the UAV, and securing the captured UAV to the capture platform.

29 Claims, 12 Drawing Sheets

ROBOTICALLY ASSISTED LAUNCH/CAPTURE PLATFORM FOR AN UNMANNED AIR VEHICLE

RELATED APPLICATION DATA

This application is related to U.S. application Ser. No. 10/908,255 entitled autonomous environmental control system and method for post-capture and pre-launch management of an unmanned air vehicle, filed concurrently herewith and incorporated by reference herein in its entirety to the fullest allowable extent.

FIELD OF THE INVENTION

Embodiments of the invention pertain to the control of an unmanned air vehicle (UAV) and, more particularly, to a robotically assisted launch/capture platform for a small UAV.

BACKGROUND OF THE INVENTION

The use of UAVs to conduct surveillance or fly other payload missions in remote and/or hostile environments or under dangerous conditions has significant benefits. The most obvious of these benefits is the avoidance of human exposure to these environments. Other benefits derive from the ability to equip a UAV with data collection instruments and sensors that provide the capability to collect a large quantity of data over a large data collection area or physically dangerous data without human intervention.

The two most common mission scenarios for small UAVs involve a mobile, land-based host platform such as a truck or trailer, for example, and a ship-based host platform including deep water and shallow water vessels. The ship-based mission platforms present the more challenging environments, particularly for capturing an in-flight UAV. Vessel platforms can be highly unstable due to rolling, pitching and yawing and other unpredictable movements of the vessel in choppy water as well as to forward motion. In addition, small, fixed-wing UAVs on the order of 10 to 300 pounds, and nominally about 100 pounds, are highly vulnerable to airwake turbulence from the vessel superstructure and prevailing winds, and the UAV may have to be captured and stabilized within a very limited space on an already crowded deck.

Conventional net-type capture systems and vertical wire systems known in the art suffer from a number of disadvantages. Both capture system approaches are known to induce high probabilities of UAV damage. These types of systems require manned assistance to complete the retrieval process beyond simply snagging the UAV. Both the weight and the wing span of the UAV being captured can significantly impact these types of capture systems. For example, a net system requires a capture area that covers an entire intended capture aperture rather than merely the space directly in front of the approaching UAV. This requirement may significantly intrude on shipboard structures and deck operations. The host ship must be controlled in bearing and speed to effect a quasi-stable target for the UAV to aim at. Attitude and UAV course errors that result in non-perpendicular initial contact with the net can snag a wingtip thus resulting in inertial forces being magnified in proportion to wing length and subsequent wing damage. The risk of damage may be compounded by subsequent buffeting while the UAV is captured within the net and exposed to prevailing or platform velocity-produced winds. Manual extraction of the UAV from the net must be done carefully to avoid entanglement and loss or destruction of the UAV during transition to storage and data download. Conventional net capture systems are not known to have a UAV lockdown mechanism.

Vertical wire capture systems likewise intrude on shipboard structures and deck operations. They also place constraints on the bearing and speed of the ship based capture structure. A UAV being captured by a vertical wire system initially engages the wire at some point along a wing causing the wire, in a glancing manner, to progress down the leading edge of the wingtip where it is snagged by a hook at the end of the wing. This causes the entire UAV to rapidly transition from flying to pinwheeling about the capture wire. Ultimately the UAV's momentum is reduced to zero, whence it hangs in the air, being buffeted by prevailing and relative winds while being manually secured and lowered to the deck.

Furthermore, these types of systems cannot be used to launch the UAV, thus a separate launch system is required. Although a mobile system may address certain of these issues, even small UAVs may generate significant inertial forces during launch acceleration and retrieval deceleration, requiring a platform having inertial stability, at odds with adaptable mobility.

Accordingly, there is a recognized need for a device that has the capability to launch and to capture a small UAV from a moving, unstable host platform. Such a device benefits from being lightweight and robust, highly maneuverable and adaptable to uncontrolled UAV motions and inertial force displacements generated during launch and capture, compact in size and capable of fully automated operation. The need is further recognized for such a device that can consistently, safely launch and retrieve a small UAV.

SUMMARY OF THE INVENTION

An embodiment of the invention is directed to a platform for launching and/or capturing an unmanned air vehicle (UAV), particularly a small UAV. As used herein, the term "small UAV" refers to a fixed wing unmanned air vehicle having a weight ranging from approximately 10 lbs to 300 lbs, and nominally weighing about 100 lbs or less. The launch/capture platform includes a frame, a floor attached to the frame that is capable of supporting the UAV, means for acquiring and tracking the UAV in flight, a connector and a connector controller, connecting the platform to an external support structure, providing a controllable, adaptive motion of the platform in response to approaching UAV position and attitude, means for launching the UAV from the platform and for capturing an in-flight UAV to the platform, and means for locking down the UAV between the capture and launch of the UAV. In a particular aspect, the external support structure to which the platform is controllably connected is a controllable robotic arm having a base at one end for secure attachment to a host platform and attached to the platform at another end thereof via the controllable connector. According to an aspect, the frame of the platform has a base member and two arm members extending transversely from respective end regions of the base member to form a generally squared U-shaped structure. According to an aspect, the means for launching the UAV from the platform and capturing an in-flight UAV to the platform build upon known "arresting-wire" systems employed extensively and successfully with manned aircraft/aircraft carrier operations and adapted to be operatively attached to the launch/capture platform. With such a system, the UAV will carry or deploy an appendage or other suitable means to hook or catch a portion of the arresting wire for launch and capture. Due to the attachment of the arresting-wire system to the platform, as opposed to being permanently affixed to a host platform, the portion of the arresting wire that can be snagged or caught by the UAV variably extends between the free ends of the arm members of the frame. In this manner, the orientation of this portion of the arresting wire can be continuously and rapidly accelerated, moved and positioned essentially as desired within the spherical-like volume of the combined reach and range of motions of the robotic arm and the launch/capture platform. According to an aspect, the means for acquiring and tracking the UAV provide information about the location of the arresting wire portion extending between the frame arm ends with respect to the snagging feature of the UAV approaching the platform for capture. The arresting-wire system can also be used to launch the UAV from the platform through controlled tensioning and release of the arresting wire and, if desired, in combination with controlled motion of the robotic arm. In various aspects, the locking down mechanism for securing the UAV upon capture and prior to launch can be an active mechanism or a passive mechanism.

Another embodiment of the invention is directed to a method for capturing a small, in-flight UAV. The method involves the steps of providing a UAV capture platform, providing a UAV capturing means as an integrated component of the platform, providing means for determining in real-time the relative location of an engaging portion of the capturing means with respect to an approaching in-flight UAV, providing means for automatically maneuvering the engaging portion of the capturing means with respect to at least one of a position and an attitude of the approaching in-flight UAV, capturing the UAV, and securing the captured UAV to the capture platform. In an aspect of the embodiment, the step of providing a UAV capture platform includes the further step of providing a common platform for launching and capturing the UAV.

In a related aspect, the step of providing a UAV capturing means as an integrated component of the platform further includes providing a UAV launching means as an integrated component of the platform. A related aspect involves launching the UAV.

The disadvantages, shortcomings and challenges in the current state of the art, as well as objects and advantages of the invention will be addressed and met by embodiments of the invention described below with reference to the detailed description and drawings that follow, and by embodiments of the invention as defined in the appended claims.

DETAILED DESCRIPTION OF A PREFERRED EMBODIMENT OF THE INVENTION

Figure 3:
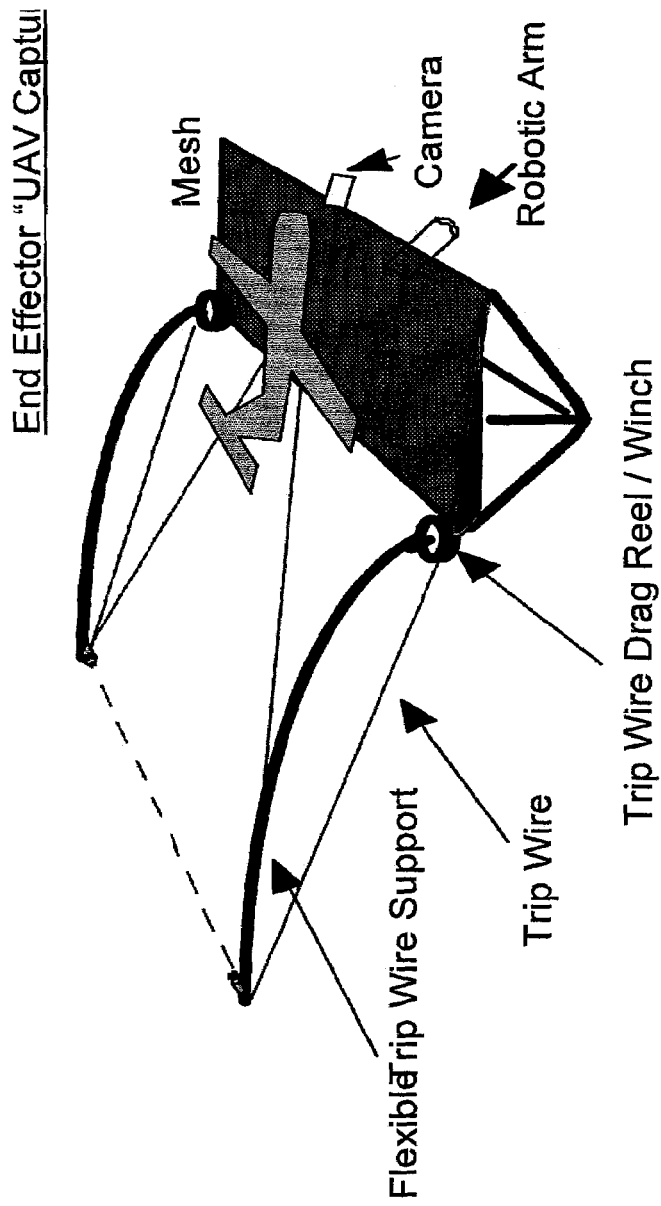
FIG. 3 is a schematic illustration of a platform proper according to an embodiment of the invention at the end of a UAV capture sequence.
Figure 4:
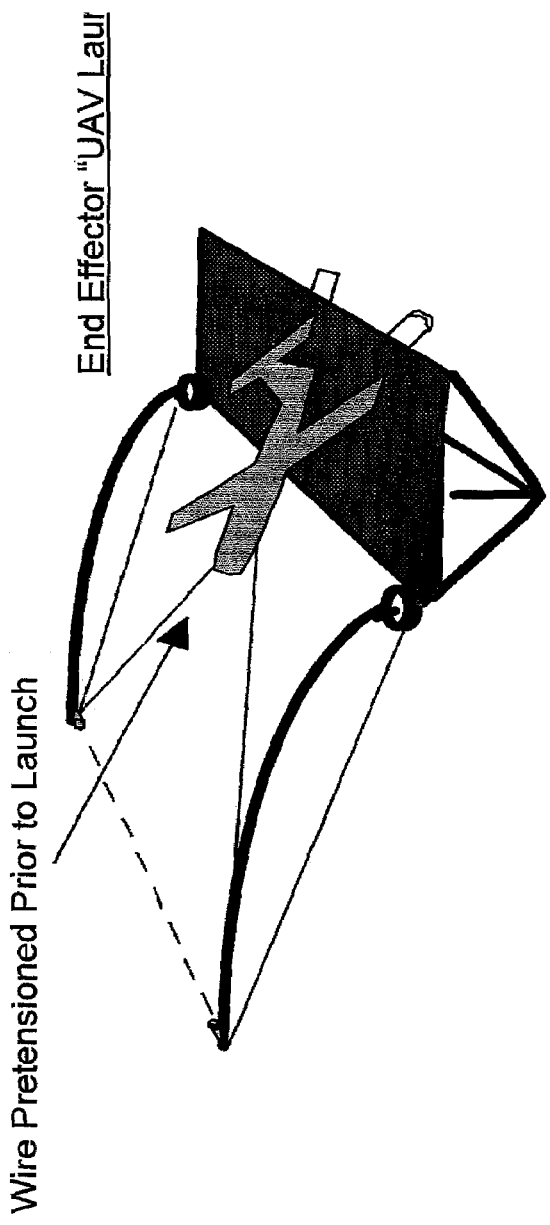
FIG. 4 is a schematic illustration of the platform proper illustrated in FIG. 3 during a launch sequence of a UAV.

An embodiment of a launch/capture platform 1000 for a small unmanned air vehicle (UAV) 5000 is illustrated with reference to FIGS. 1 and 2. The platform 1000 includes a frame 100 having a pair of arm members 101, 102 extending transversely from a base member 103 of the frame. Each of the arm members 101, 102 has a free end 105, 104, respectively. The arm members can be of varying length and, in an exemplary aspect, extend from the base member on the order of about 12 feet. Shorter or longer arm lengths may be used and can be selected based upon a variety of factors that will be clearly understood by a person skilled in the art based on the disclosure described herein below. It is advantageous if the platform 1000 can be made to be rapidly maneuverable and also strong enough to handle the inertial forces generated by capturing and launching a small UAV weighing up to 300 pounds. Thus, suitable materials for the frame include fiberglass, carbon fiber, fiber composites, aluminum, and other metal or non metallic compositions as a person skilled in the art would understand. As shown in the illustration of FIGS. 3 and 4, the arm members may flex into a curved state during launch and capture operations and yet be rigid enough to maintain integrity of the platform during pre-capture maneuvering. The platform further comprises a floor 111 attached to the frame. The floor is intended to serve as a launching and landing pad and thus must have the structural integrity to support the weight of the UAV. Various materials and designs may be suitable for the floor 111; for example, the floor may comprise a rigid plastic or metallic mesh structure that will facilitate locking down the UAV upon capture and prior to launch as will be described in greater detail below. Alternatively, the floor could have a magnetic surface generated by an electromagnet that would be complimentary to a metallic portion of a landing surface on the UAV. Another alternative floor surface may incorporate a Velcro®-type material with a complimentary material located on a portion of a landing surface of the UAV.

The platform 1000 further includes a mechanism 160 for launching the UAV from the platform and capturing the in-flight UAV to the platform. In an exemplary aspect, means for launching and capturing the UAV comprise an arresting-wire system that includes a pair of drag wheels or otherwise active reels, 163, that provide a controllable wire pay-out, a direct drive motor 164 for controlling pay-out and retraction of an arresting-wire supply in the event active reels are not used, and the arresting-wire 161, as illustrated in FIG. 2. Arresting-wire systems are known in the art as typically employed with manned aircraft on aircraft carrier platforms. The same type of system (on a smaller scale) is adapted to be an integral part of the platform 1000 according to an embodiment of the invention. Wire guides or runners 106, 107 are located at the free ends 105, 104 of the arm members of the frame so that a UAV-engageable portion 162 of the arresting-wire can variably extend between the free ends of the arm members depending on pay-out. During the UAV capture process, described in more detail below, the arresting wire can be payed-out in a controlled manner from the drag wheels or active reels, 163, (one at each end of the wire) or from a reel directly associated with the motor 164. The wheels or reels 163 may be differentially controlled by known means. Such differential control will provide both UAV deceleration upon capture and steering of the captured UAV to alter the final path of the engaged UAV to the relatively small landing pad floor 111.

The platform 1000 further comprises one or more sensors 130 for acquiring and tracking the in-flight UAV as well as providing geo-stabilization for the overall guidance required to intercept an incoming UAV. The sensor(s) in conjunction with a dedicated flight path processor and associated data and wireless communication links (not shown) to the robot arm and platform provide closed-loop, inertially driven control of the position and orientation of the platform in space. An RF wireless communication link between the flight path processor and the UAV directly contributes to successful UAV capture by coordinating relative aircraft and platform motions. The sensor 130 may be part of a known differential global positioning satellite (GPS) system, which uses telemetry to provide second by second position information between the approaching UAV and the platform 1000 with an accuracy on the order of millimeters. Particularly, it will be advantageous to know the relative distance between the engaging portion 161 of the arresting-wire and a hook or other engagement means 5005 attached to the UAV 5000. Although in the illustrated aspect of FIGS. 1 and 2 the sensor 130 is mounted to the platform, those skilled in the art will appreciate that the appropriate sensor(s) may be remotely located onboard a host platform such as a ship or vehicle, for example, as long the position coordinates of the engaging portion of the arresting-wire are known by the system. An alternative sensing means for acquiring and tracking the in-flight UAV, and for providing real-time correction inputs to a landing system processor, may include single or multiple video sensors mounted on the platform 1000. In an exemplary aspect, the sensors are television cameras that are sensitive to infrared radiation (IR) that may be emitted directly by IR beacons on strategic regions of the UAV (e.g., wings, tail, nose) or emitted from the platform and reflected from the UAV back to the sensors. Active illumination at the UAV can enable angular measurements to multiple points on the UAV for determining its range in a single frame image from a video sensor. Multiple frames can further reveal UAV speed, attitude and flight path with respect to the platform to simplify error correcting algorithms. The relative displacements that occur for each UAV point between frames serves to define a set of vectors whose length and angularity can be mapped to yield (in conjunction with known sensor parameters) complex UAV motions and flight path. This is analogous, for example, to techniques currently used in the study/measurement/cartoon emulation related to animate objects in dynamic motion (human runners, etc.) using camera sensors and computers.

Figure 2:
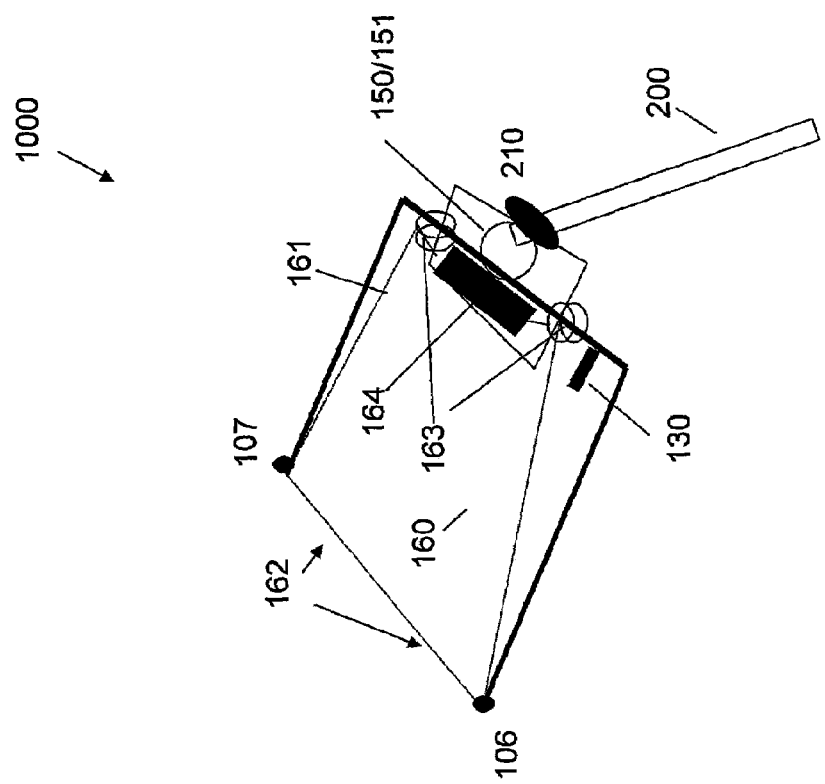
FIG. 2 is an underside view of the platform illustrated in FIG. 1, additionally illustrating the platform connection to an external support structure according to an embodiment of the invention.

A single or multi-axis connector 150 and associated controller 151, as shown in FIG. 2, allows the platform 1000 to be maneuverably connected to an external support structure 200. The connector 150 should provide at least a tilting motion of the platform. In an exemplary aspect, the connector/controller 150/151 can move the plane of the platform 1000 containing the arms 101, 102 and the attached arresting-wire 161 between a substantially horizontal position and a substantially vertical position (i.e., ±90 degrees).

Figure 1:
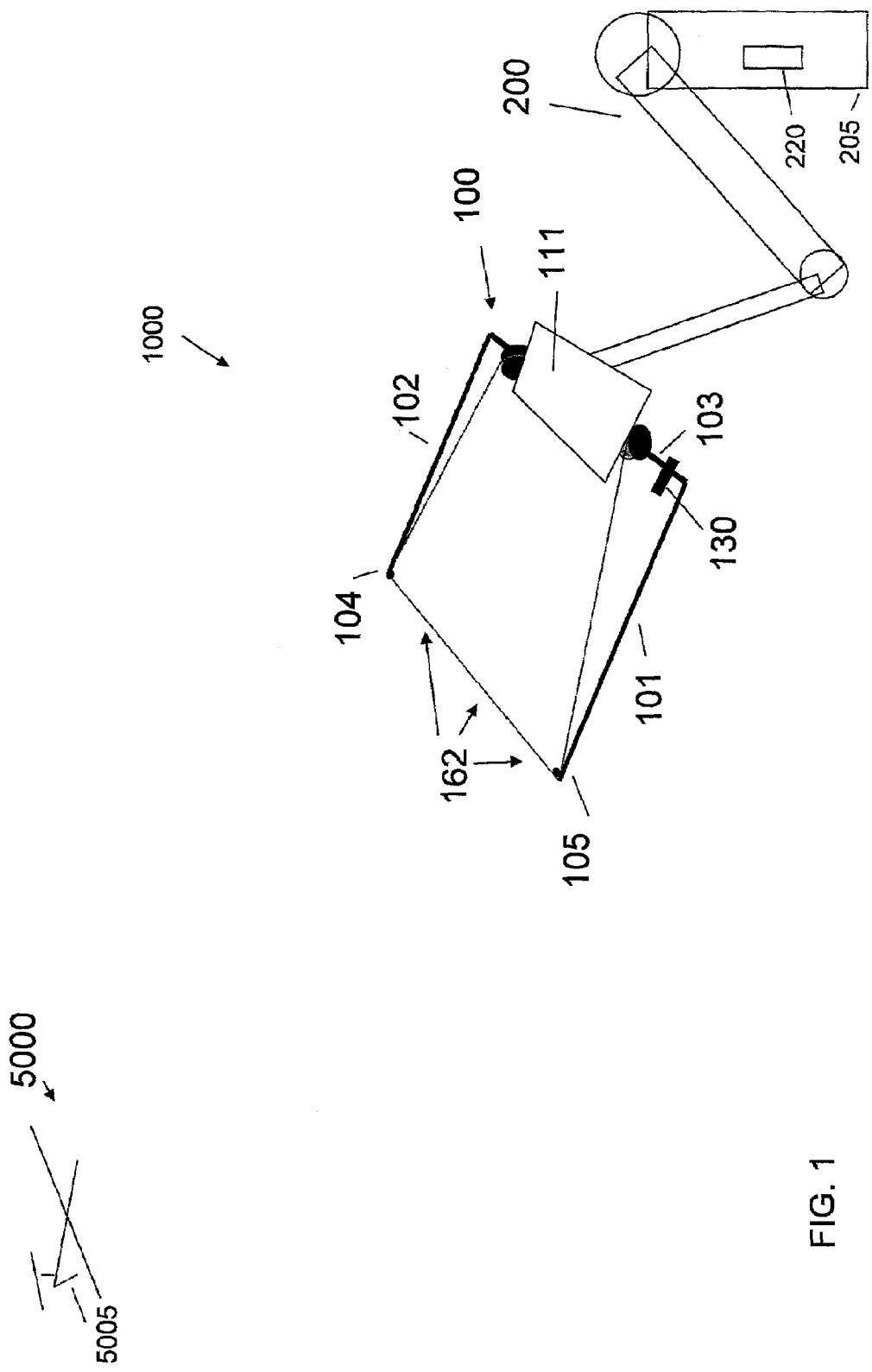
FIG. 1 is a schematic illustration of certain primary components of an assembled UAV launch/capture platform according to an embodiment of the invention.
Figures 5A, 5B:
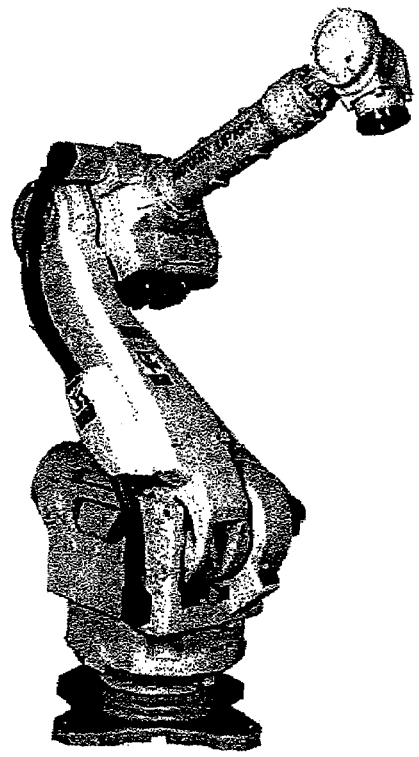
FIG. 5A is a photocopy of a robotic arm according to an exemplary embodiment of the invention.
FIG. 5B is a list of specifications for the robotic arm shown in FIG. 5A.

As further shown in FIGS. 1 and 2, the platform 1000 is connected via connector 150 to an end 210 of an exemplary multi-axis robotic arm 200 including a controller 220 and a base 205 for securing the robot arm to a host platform. An exemplary robotic arm suitable for use according to an embodiment of the invention is the UP165 Robot manufactured by Motoman Co. (West Carrollton, Ohio), a picture of which is shown in FIG. 5A. The UP165 Robot provides six axis range of motion as indicated on the specifications sheet shown in FIG. 5B. The robot arm can stabilize and position the platform 1000 in such a manner to maximize the probability of a successful UAV capture. The scale, weight carrying capability, shock resistance and environmental ruggedness of the robot arm provide it with the capability to cancel a relatively wide range of host platform motions, such as that of a ship at sea or moving vehicle, to stabilize the end 210 of the arm in three-dimensional space and otherwise normalize such platform motions to be isolated and independent from platform positioning motions required to intercept and capture an approaching UAV. By way of the connector/controller 150/151, the platform 1000 is capable of rapid and highly adaptive mechanical motions and accelerations, which are required to successfully accomplish small UAV retrieval operations. During UAV capture and retrieval, the platform supports the generation of rapid dynamic motions that compliment those of the slower underlying robotic arm. This includes providing added reach and angular accelerations needed to drive intercepts with small UAVs approaching at various bearings, altitudes, attitudes, and over a range of nominal velocities between 3-60 miles per hour. Small UAV intercepts require rapid, real time corrective movements to accurately and repeatably engage such UAVs and their highly non-repeatable flights and attitudes within the capture area of the combined robotic arm and the platform. The combination of robotic arm motion, the tiltable motion of the platform, and the variable tensioning in the arresting-wire provide critical decelerative forces and mechanical guidance that will allow consistent, damage-free capture and landing of the UAV.

The same components provide the degree of controlled accelerative forces required for successfully launching the UAV from the platform. Typically, launching the UAV requires safely bringing it to flight air speed within a small distance, comparable to the capture distance required for retrieval. Accelerative forces need to vary to accommodate initial air velocity conditions at the UAV and UAV flight air speed requirements. Launching can be accomplished from the platform by use of the same wire as employed during capture, in combination with robot arm motion, if desired. The UAV is attached to the wire, positioned and oriented for launch. Launch acceleration is enabled by wire tension-induced forces between the wire supports and the UAV and/or in combination with robot arm-induced acceleration.

The launch/capture platform 1000 further has means for locking-down the UAV upon capture and prior to launch. Various lockdown mechanisms are known in the art. For example, U.S. Pat. No. 5,092,540 discloses a landing pad grid for securing a remotely piloted vehicle (RPV). The grid operates in conjunction with probes that extend from a landing surface of the RPV, the probes having retractable wings that project out at right angles from the probes. As the RPV engages the landing pad, the probes penetrate the pad mesh whereupon the wings are extended below the mesh pad to secure the RPV to the landing pad until such time as the wings are retracted into the probes and the RPV can be released from the pad. Alternatively, an electromagnet could be engaged with a suitable floor material to generate a sufficient magnetic force between the floor surface and a complimentary landing surface of the UAV to secure the UAV to the floor upon capture and to hold the UAV in place prior to launch. If the arresting-wire system is used as the launch mechanism for the UAV, the launch wire would be appropriately tensioned and the magnetic field turned off to release the UAV at the precise moment of launch. A passive lockdown mechanism such as a Velcro®-type attachment of a bottom surface of the UAV to the floor may also provide a secure lockdown. In this aspect, alternative arrangements would be made for launching the UAV.

Figure 6:
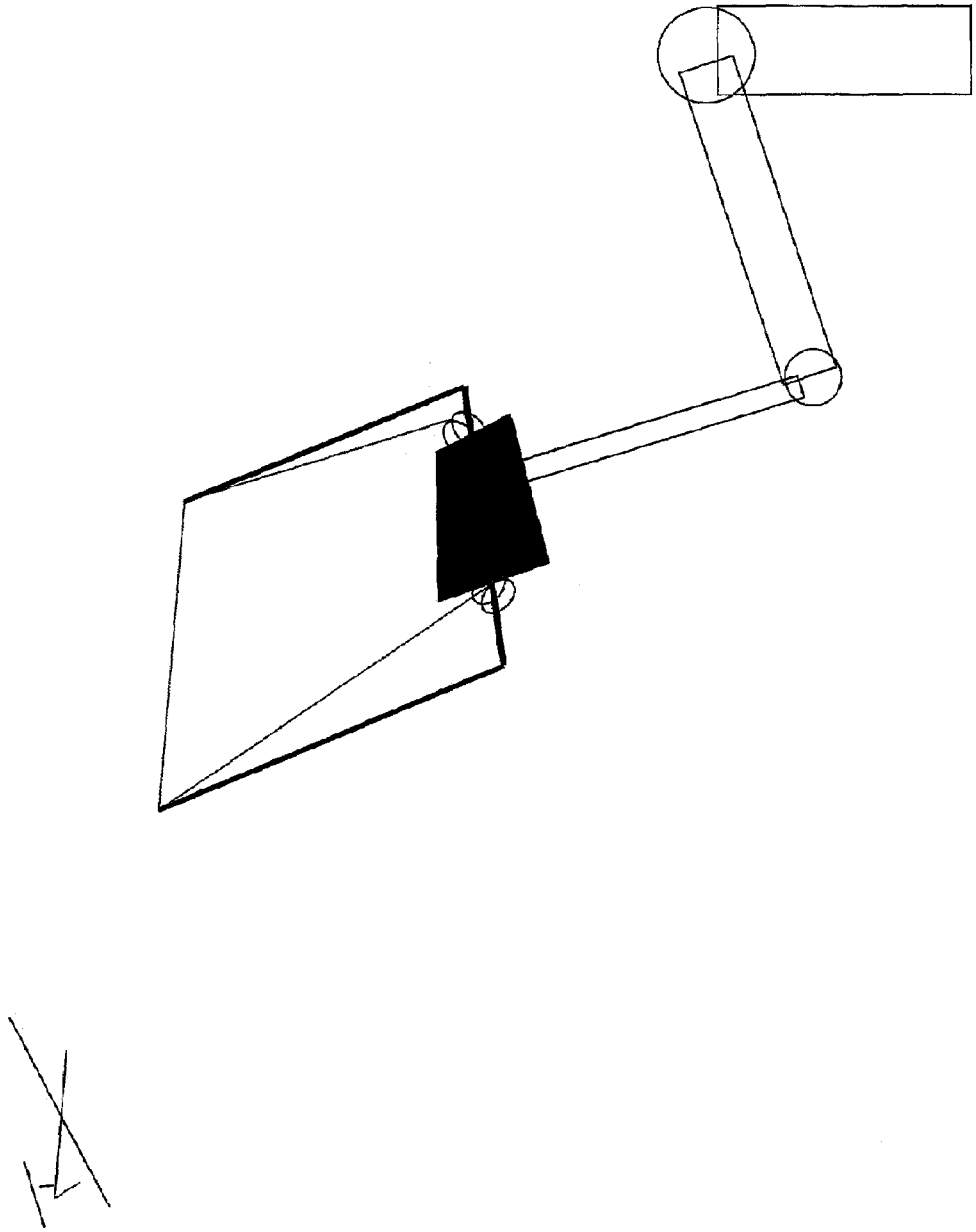
FIGS. 6-12 are schematic illustrations of the launch platform illustrated in FIGS. 1 and 2 showing sequential positioning of the robot arm and platform during a UAV approach and capture sequence according to an embodiment of the invention.
Figure 7:
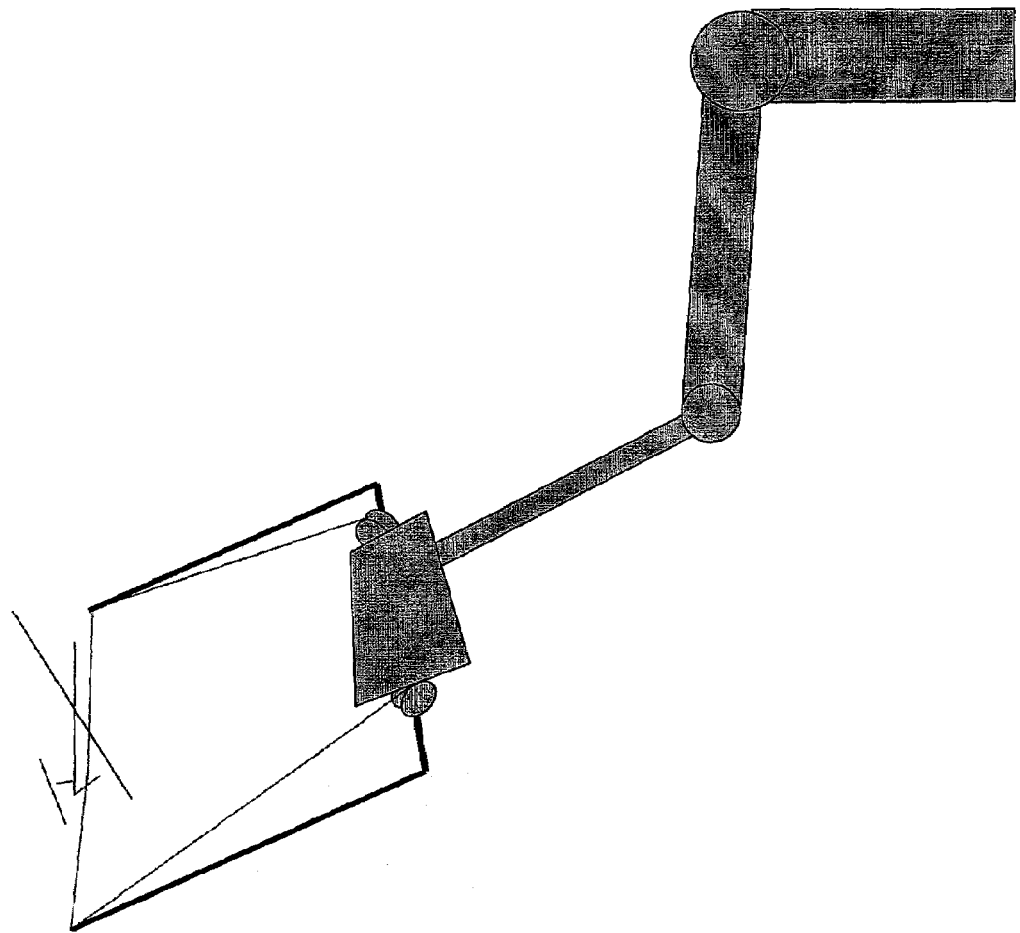
Figure 8:
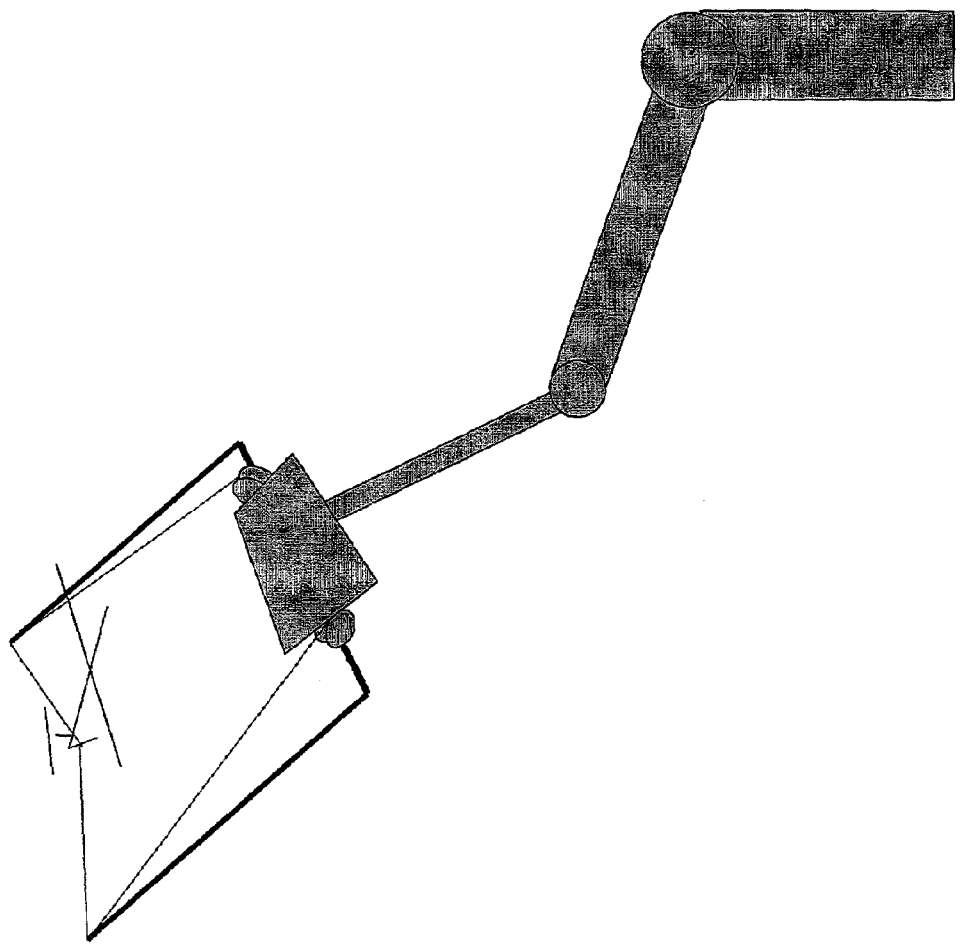
Figure 9:
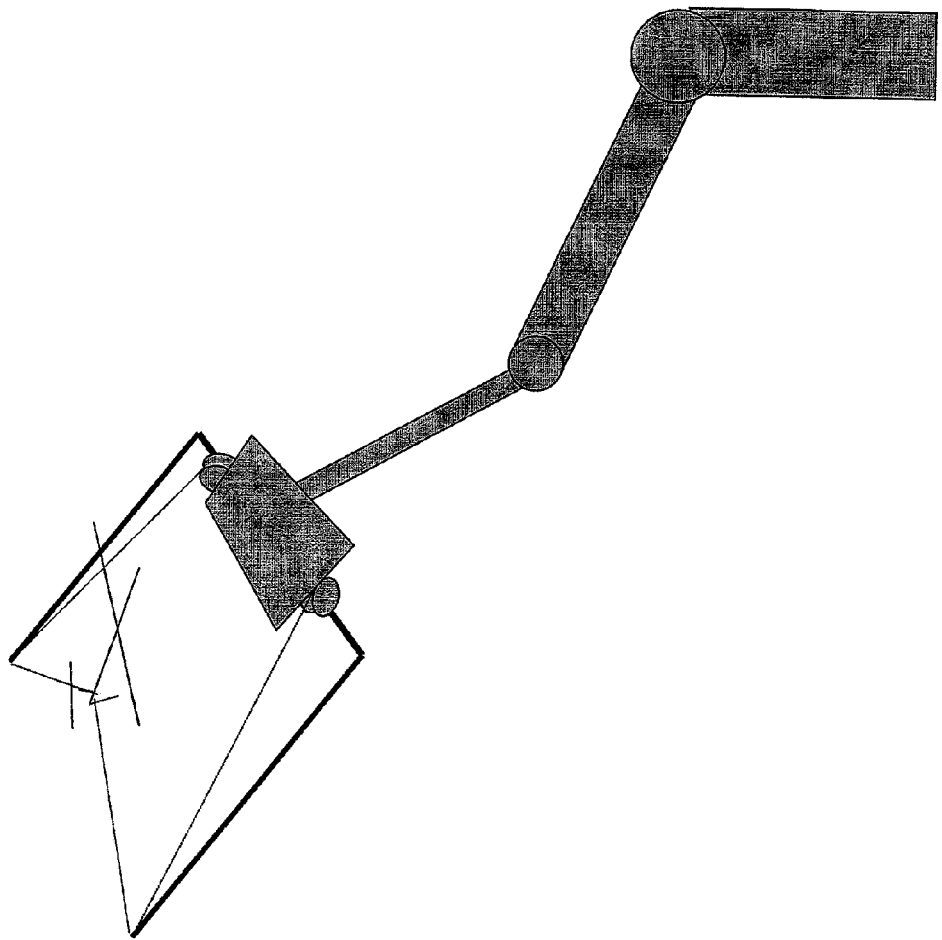
Figure 10:
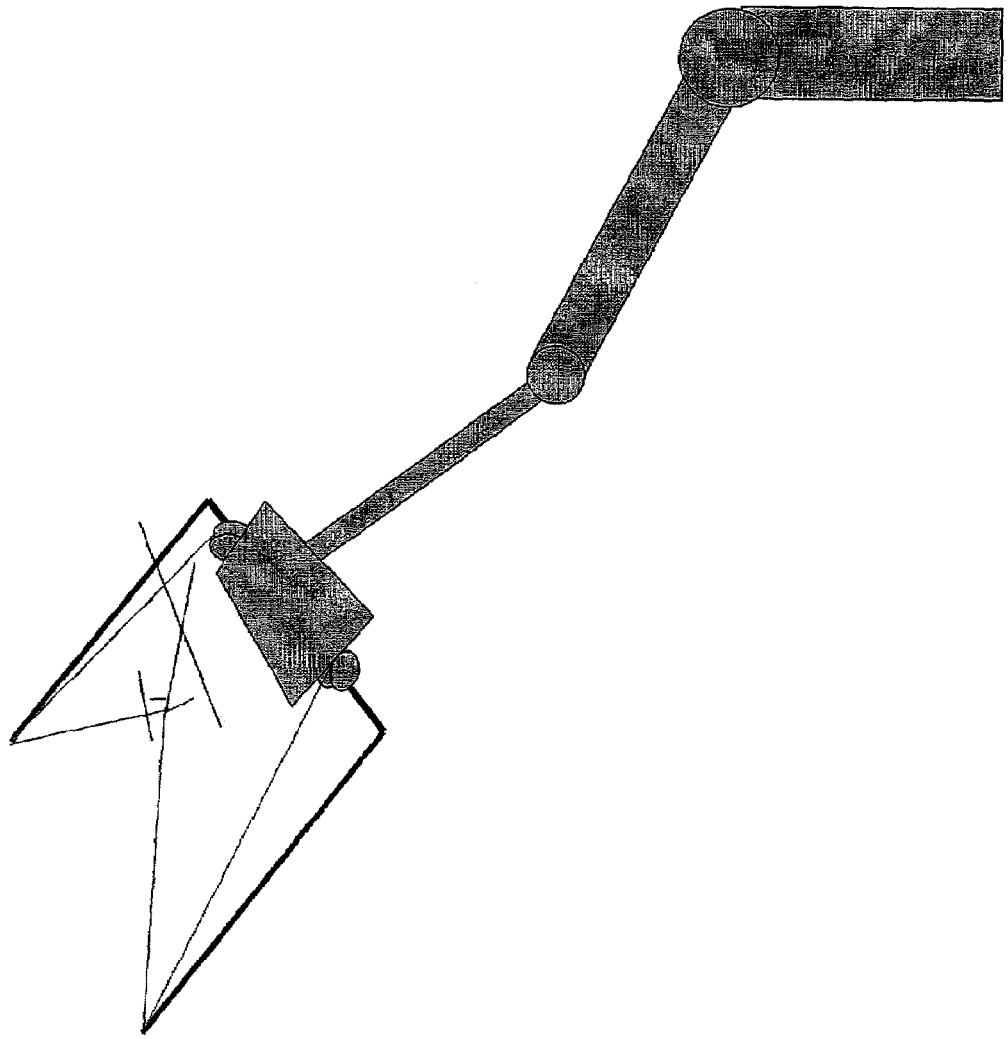
Figure 11:
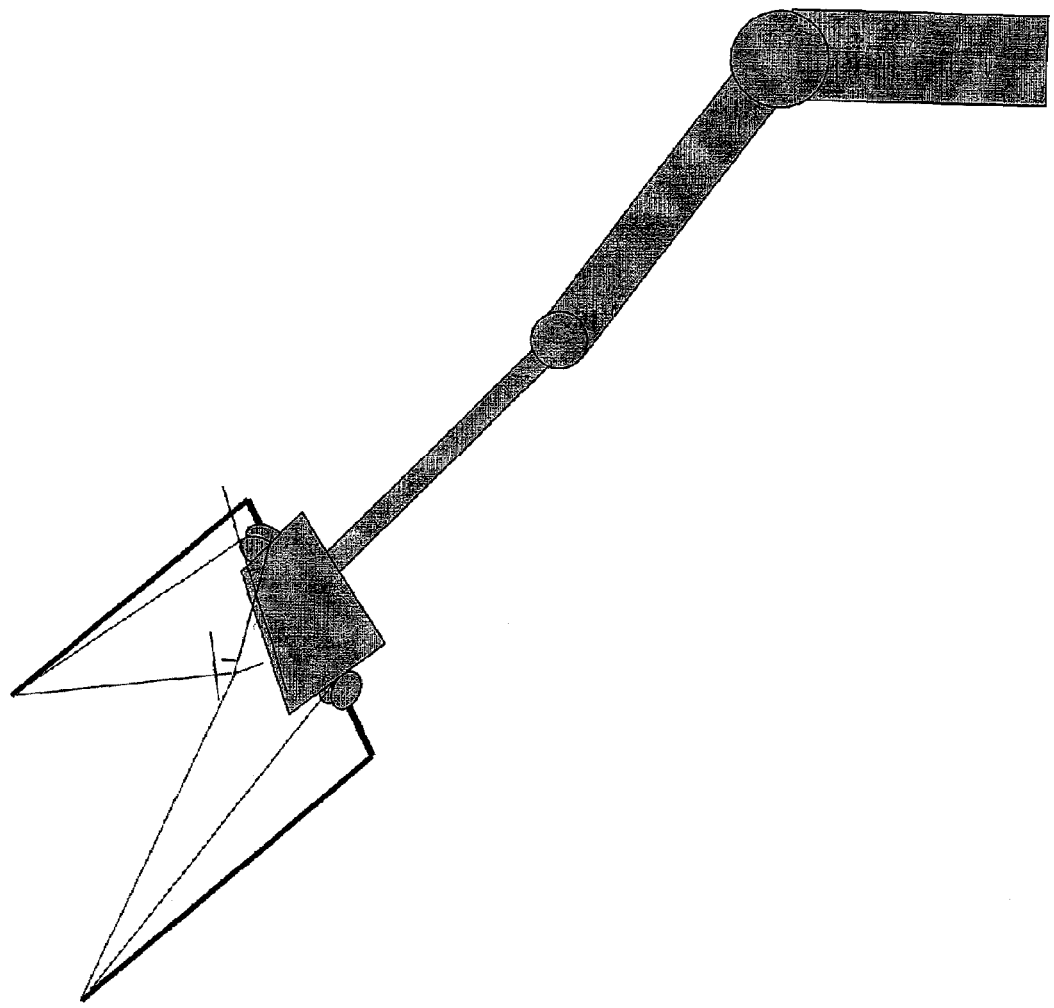
Figure 12:
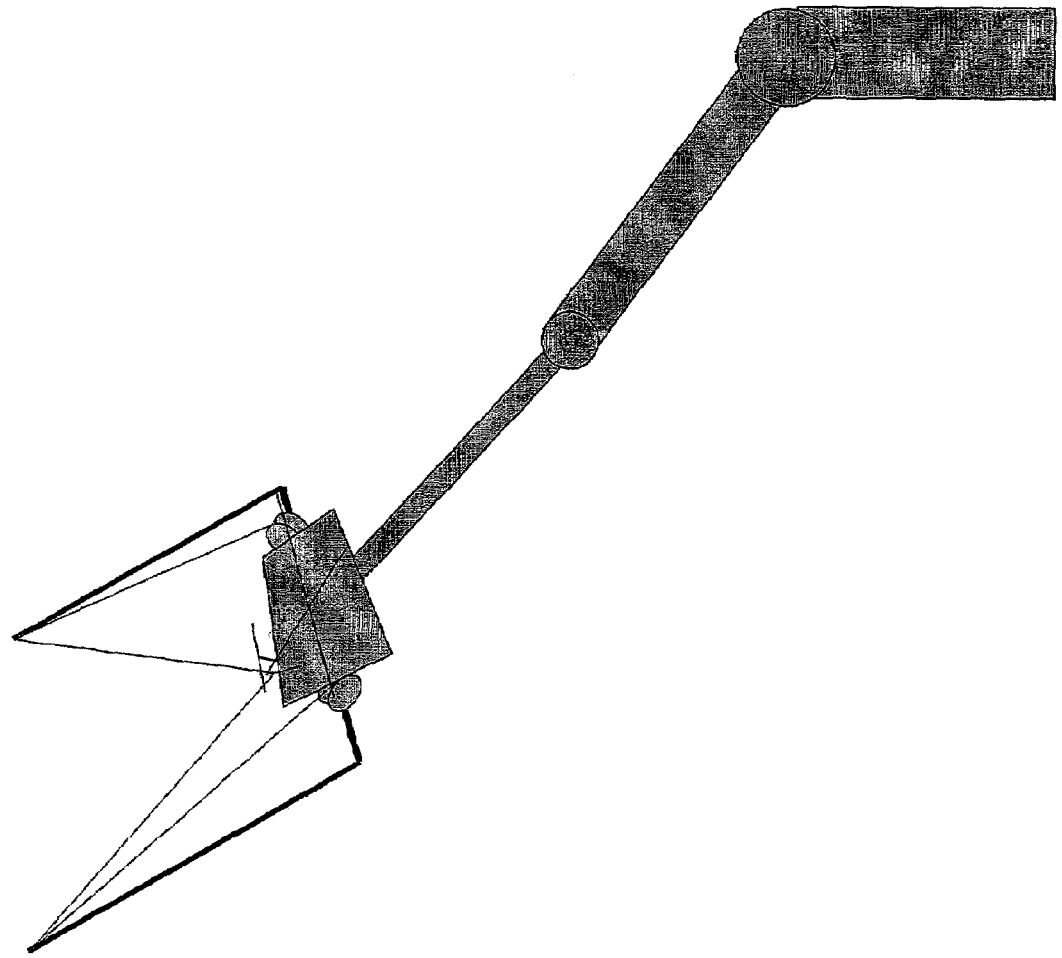

FIGS. 6-12 schematically and sequentially illustrate a method embodiment according to the invention for capturing a small, in-flight, UAV 5000. A capture platform 1000 as illustrated, for example, in FIGS. 1 and 2 is provided. The platform includes integral UAV-capturing means 160, sensor/feedback means 130 for determining in real-time the relative location of an engaging portion 161 of the capturing means with respect to an approaching in-flight UAV 5000/5005, and robotic means 150/151, 200/220 for automatically maneuvering the engaging portion of the capturing means with respect to the approaching in-flight UAV. In an exemplary embodiment, these means are provided, respectively, by an arresting-wire capture/launch system 160 including tension-controlled wire payout, one or more sensors 103 and associated processor/data link/communication for acquiring and tracking the in-flight UAV and providing closed-loop feedback for moving and positioning the robot arm and platform, and a controllable connector 150 attaching the platform 1000 to a multi-axis robotic arm 200, interfaced to the feedback loop for maneuvering the robot arm and the platform (and particularly the engaging portion 162 of the arresting-wire with respect to the approaching UAV). As shown in FIG. 1, the UAV 5000 is beginning its approach from a maximum approach distance and the platform 1000 is positioned relatively horizontally. As the UAV gets closer to the capture platform, as illustrated in FIG. 6, the robot arm 200 has lifted the platform from its initial position and, via the connector/controller 150/151, the platform is tilted to a substantially vertical position in response to feedback provided by the acquisition and tracking sensor/flight processor relating to the relative position of the engaging portion 161 of the arresting-wire and the engagement means 5005 of the UAV. The angular action at the platform/robot arm connection interface 150/151 is translated into extremely rapid movement of the engaging portion of the arresting-wire through space as amplified by the length of the arm members of the frame. A low mass associated with the frame and wire results in low motion-related acceleration forces, which allow rapid correction of platform positioning with low torque effects. The low mass of the arresting-wire and support frame also enables it to be reasonably extended (e.g., multiple feet; 12 feet in an exemplary aspect) beyond that of the robot arm itself, thereby promoting UAV engagement that is more spatially isolated from the host platform, if desired for safety and utility reasons. Such an extended engagement distance also reduces the inertial forces from UAV deceleration in direct proportion to the increased distance between engagement and arrestment at the landing pad floor. Long wire-supporting frame arms also provide increased flexure and shock absorption during the capture sequence. As shown in FIG. 7, the platform is positioned to intercept the UAV. Once the UAV is snagged, as shown in FIG. 8, the arresting-wire system provides decelerative forces to the UAV. If desired, platform position may also be maneuvered by the robot arm to further reduce differential inertial forces generated by the decelerating UAV. FIGS. 9-12 illustrate the final touchdown sequence of the UAV on the floor of the platform, whereupon the UAV is secured to the platform by appropriate lockdown means.

In the exemplary embodiment described above, the arresting-wire system can also be used to launch the UAV from the platform. This is illustrated schematically in FIG. 4, wherein the arresting-wire has been pretensioned and the UAV can be launched with or without accelerative forces provided by motion of the robotic arm.

According to the embodiments described above, a system and method are disclosed for capturing and/or launching a small UAV. A common launch and capture platform is provided that is lightweight and accurately and rapidly maneuverable by means of a controllable connector interfacing the platform to a controllable, multi-axis robotic arm.

The foregoing description of the embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A launch/capture platform for an unmanned air vehicle (UAV), comprising:
   a frame having a pair of arm members each extending transversely from a base member and each having a free end;
   a floor attached to the frame capable of supporting the UAV;
   means for acquiring and tracking the UAV;
   a connector cooperatively engaging the platform to an external support structure, and a connector controller, wherein the connector and associated controller provide controllable, adaptive (real-time) motion of the platform;
   means for launching and capturing the UAV from and to the platform, respectively; and
   means for locking-down the UAV between the capture condition and the launch condition.

2. The launch/capture platform of claim 1, wherein the external support structure comprises a robotic arm having a base at one end thereof to stabilize the robotic arm, further wherein the arm is connected at another end thereof to the connector, and an associated robotic arm controller.

3. The launch/capture platform of claim 2, wherein the robotic arm has up to six independent axes of controllable motion.

4. The launch/capture platform of claim 1, wherein the connector and controller provide a continuously variable tilt motion of the platform between a relative horizontal orientation and a relative vertical orientation.

5. The launch/capture platform of claim 1, wherein the means for acquiring and tracking the UAV includes a differential GPS system.

6. The launch/capture platform of claim 1, wherein the means for acquiring and tracking the UAV includes a sensor for determining a relative position between the platform and a capture means associated with the UAV.

7. The launch/capture platform of claim 6, wherein the means for capturing an in-flight UAV includes an arresting-wire portion, further wherein the sensor is adapted to determine a relative position between the arresting-wire portion and a capture means associated with the UAV.

8. The launch/capture platform of claim 6, wherein the sensor is located on the platform.

9. The launch/capture platform of claim 6, wherein the sensor is located remote to the platform.

10. The launch/capture platform of claim 1, wherein the means for acquiring and tracking the UAV includes at least two sensors for detecting an orientation indicia of the UAV.

11. The launch/capture platform of claim 10, wherein the at least two sensors are at least two television cameras.

12. The launch/capture platform of claim 10, wherein the at least two sensors are sensitive to IR illumination.

13. The launch/capture platform of claim 1, wherein the means for launching the UAV from the platform include a catapult system.

14. The launch/capture platform of claim 1, wherein the means for capturing an in-flight UAV includes at least two drag wheels including a drag control.

15. The launch/capture platform of claim 1, wherein the drag control includes a differential control for each of the drag wheels.

16. The launch/capture platform of claim 1, further comprising at least one sensor to detect at least one of a wind speed and a wind direction.

17. The launch/capture platform of claim 1, wherein the floor comprises a mesh structure.

18. The launch/capture platform of claim 1, wherein the floor comprises a hook and loop frictional surface.

19. The launch/capture platform of claim 1, wherein the floor comprises an electromagnet.

20. A launch/capture platform for an unmanned air vehicle (UAV), comprising:
   a frame having a pair of arm members each extending from a base member and each having a free end;
   a floor attached to the frame capable of supporting the UAV;
   a UAV acquisition and tracking sensor cooperatively engaged with the platform;
   an arresting wire system adapted to provide UAV launching and capturing support cooperatively engaged with the platform, including an arresting wire, a motor, a strain sensor and a plurality of drag controllers, wherein a variable portion of the arresting wire extends between the free ends of the arm members;
   a controllable connector cooperatively engaging the platform to an external support structure, having a range of motion controlled by a feedback signal supplied by the acquisition and tracking sensor; and
   a locking-down mechanism adapted to secure the UAV between the capture condition and the launch condition.

21. The launch/capture platform of claim 20, wherein the controllable connector has a continuously variable range of tilting motion between a relative horizontal orientation and a relative vertical orientation.

22. The launch/capture platform of claim 20, wherein the external support structure is a controllable robotic arm.

23. The launch/capture platform of claim 20, wherein the acquisition and tracking sensor comprises a differential GPS system.

24. The launch/capture platform of claim 20, wherein the acquisition and tracking sensor comprises a television camera.

25. The launch/capture platform of claim 24, wherein the acquisition and tracking sensor comprises at least two television cameras adapted for infrared viewing.

26. A method for capturing a small, in-flight UAV, comprising:
   providing a UAV capture platform;
   providing a UAV capturing means as an integrated component of the platform;
   providing means for determining in real-time the relative location of an engaging portion of the capturing means with respect to an approaching in-flight UAV;
   providing means for automatically maneuvering the engaging portion of the capturing means with respect to at least one of a position and an attitude of the approaching in-flight UAV;
   capturing the UAV; and
   securing the captured UAV to the capture platform.

27. The method of claim 26, wherein providing a UAV capture platform further comprises providing a common platform for launching and capturing the UAV.

28. The method of claim 27, wherein providing a UAV capturing means as an integrated component of the platform further comprises providing a UAV launching means as an integrated component of the platform.

29. The method of claim 28, further comprising launching the UAV.

* * * * *